Figure 1:
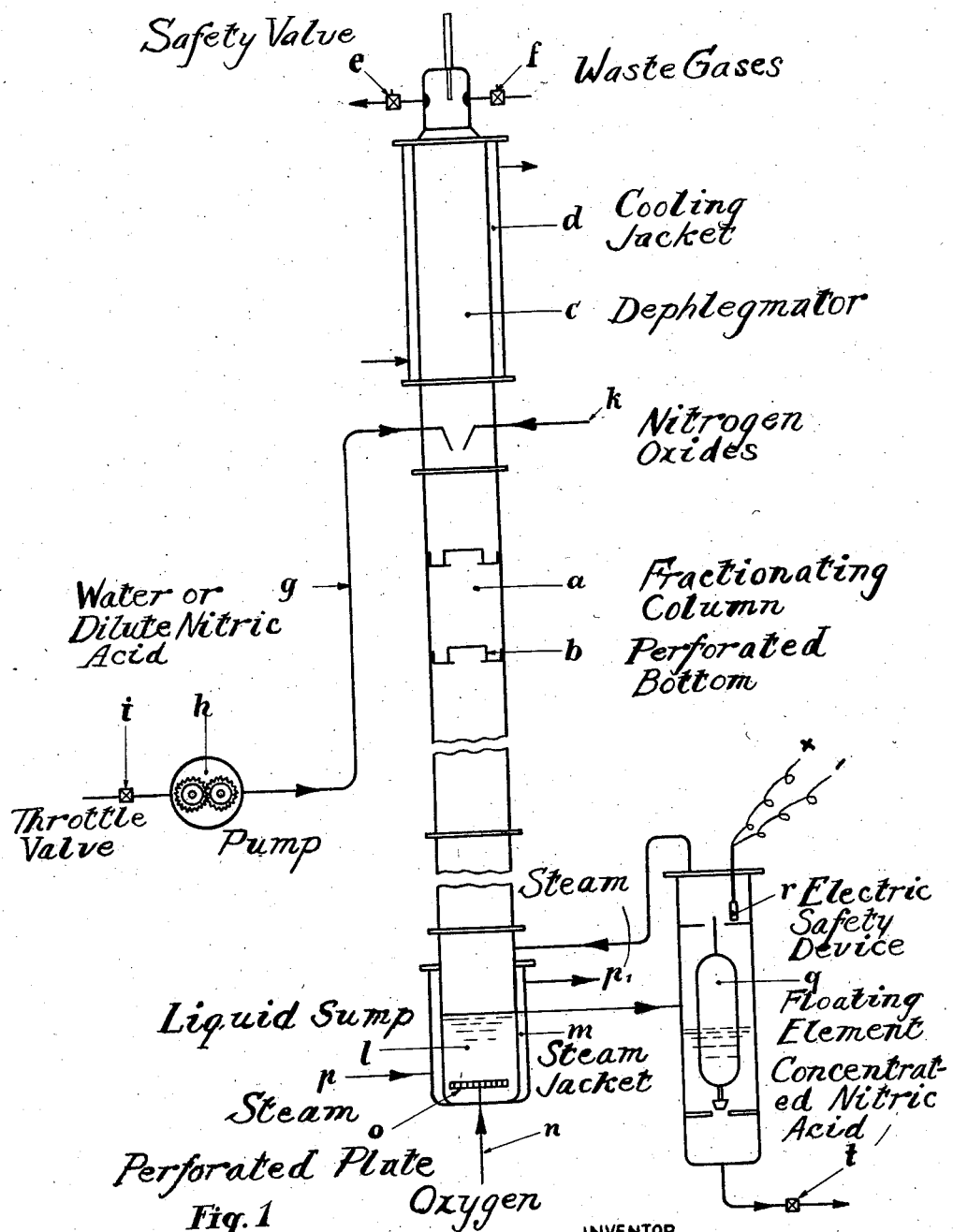

Patented Jan. 21, 1936

2,028,402

UNITED STATES PATENT OFFICE 2,028,402

PROCESS FOR THE PRODUCTION OF CONCENTRATED NITRIC ACID

Emil Lüscher, Basel, Switzerland, assignor to Lonza Elektrizitatswerke und Chemische Fabriken Aktiengesellschaft (Gampel), Basel, Switzerland Application May 27, 1933, Serial No. 673,153
In Germany June 4, 1932

7 Claims.  (Cl. 23—160)

This invention relates to the continuous production of concentrated nitric acid.

It is known that concentrated and also highly concentrated nitric acid can be prepared from water or dilute nitric acid, nitrogen oxides and oxygen under pressure and at elevated temperature.

It has been proposed to carry out the aforesaid conversion continuously in a vertical column, into which water is introduced at the top, liquid nitrogen tetroxide at a somewhat lower level and oxygen at the bottom. A considerable excess of nitrogen tetroxide is maintained during the operation, the quantity of $N_2O_4$ relatively to the water being always at least in the ratio 15:1. The temperature in the lower end of the column is raised to about 50 to 60° C. and the top part of the column is cooled. Two immiscible liquid phases are formed inside the column, of which the upper phase consists principally of liquid nitrogen tetroxide and the lower of concentrated nitric acid, which continuously discharges from the bottom of the vertical column.

It is also known that the interaction between water or dilute nitric acid, nitrogen oxides and oxygen can be accelerated by ensuring fine distribution between the liquid and gaseous phases. It has accordingly already been proposed to carry out this interaction in a fractionating column charged with fillers by introducing water or dilute nitric acid, nitrogen tetroxide and oxygen at the top of the column, the oxidation of the nitrogen oxides and the formation of nitric acid taking place in the upper part of the column, whilst fractionation of the downwardly trickling acid is effected by heating the lower part of the column to 100° to 125° C., in such a manner that an aqueous nitric acid collects in the lower part of the column, whilst at the level in the middle part of the column where the temperature is from 85° to 90° C. anhydrous $HNO_3$ in the form of vapour is present and can be drawn off at this point.

The result of the regulation of the temperature in this latter process, in such a way that the temperature in the middle part of the column already exceeds the boiling temperature of anhydrous $HNO_3$ (86° C.) and increases in the downward direction until it reaches 100° to 125° C. in the lower part of the column, is that all the nitrogen oxides, i. e. both the lower oxides (NO and $N_2O_3$) and also the nitrogen tetroxide, are removed from the acid chiefly formed in the upper part of the column during its passage downwards through the fractionating zone, so that the anhydrous nitric acid occurring in the middle part of the column is already free from nitrogen tetroxide, whilst below this point only fractionation of diluted nitric acid takes place in the column with the result that at the lower end of the column a weaker nitric acid, entirely freed from nitrogen oxides and having a water content corresponding to the temperature prevailing at this point, is obtained.

In contradistinction thereto it has been found according to this invention that, when carrying out the interaction between water or dilute nitric acid, excess of nitrogen oxides, for example nitrogen tetroxide, and oxygen at elevated pressure in a column or column-type apparatus whilst supplying heat to the lower part of the column and condensing the vapours formed in the upper part of the column, for example by water- or air-cooling, considerable technical and economical advantages are obtained if the heat supply to the lower part of the column is so regulated whilst introducing the oxygen into the lower part of the column that, at this point, the temperature only reaches the boiling point at the prevailing pressure of the nitric acid having the desired maximum content of $HNO_3$ and a content of about 5 to 20% of $N_2O_4$ occurring at this point and does not in any part of the column reach the boiling point of nitric acid free from nitrogen oxides and water at the prevailing pressure. The lower oxides of nitrogen formed during the reaction are thereby constantly removed up the column, whilst such a quantity of nitrogen tetroxide is left in the liquid trickling down in the column in counter-current to the ascending oxygen and lower nitrogen oxides that fresh $HNO_3$ is constantly formed in the downwardly trickling liquid and a liquid nitric acid having the desired maximum content of $HNO_3$ together with a content of $N_2O_4$ amounting to about 5 to 20%, collects at the lower end of the column.

The aforesaid method of operating is based on the recognition of the fact that the following reactions take place in the column.

The formation of concentrated nitric acid by the interaction of nitrogen tetroxide with water and oxygen proceeds in accordance with the following combined equation:

1.  $2N_2O_4 + 2H_2O + O_2 = 4HNO_3$ 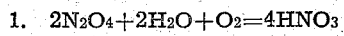

The individual chemical and physical reactions which take place in this case are, however, extremely numerous and complicated, so that the interaction does not actually proceed according to the above equation, especially since molecular oxygen is not capable, even under pressure, of oxidizing $N_2O_4$ to $N_2O_5$ and the nitrous acid, under the conditions in question, is not oxidized direct to $HNO_3$.

The following intermediate equations perhaps show the course of the different reactions better than the above combined Equation 1:

On the one hand the $N_2O_4$ reacts with water or dilute nitric acid with the formation of $HNO_2$ and $HNO_3$ according to the equation:

2. $N_2O_4 + H_2O = HNO_2 + HNO_3$

On the other hand the $HNO_2$ formed according to Equation 2 dissociates under the prevailing reaction conditions chiefly into $N_2O_3$ and $H_2O$ according to the equation:

3. $2HNO_2 = N_2O_3 + H_2O$

The $N_2O_3$ formed, for example, according to this equation, insofar as sufficient oxygen is present, is oxidized to $N_2O_4$ according to the equation:

4. $2N_2O_3 + O_2 = 2N_2O_4$

The remaining $N_2O_3$, however, reacts with already formed $HNO_3$ according to the equation:

5. $N_2O_3 + 2HNO_3 = 2N_2O_4 + H_2O$.

The reactions according to Equations 2, 3 and 5 proceed substantially in the liquid phase, whilst the reaction according to Equation 4 proceeds substantially in the gaseous phase.

The reactions according to Equations 3 and 5 counteract the formation of $HNO_3$ according to Equation 2. The essential factor in this case is that $N_2O_4$ is inert towards concentrated nitric acid, whilst $HNO_2$ and $N_2O_3$ are rapidly oxidized by concentrated nitric acid according to Equation 2 reversed and according to Equation 5, so that as the content of $HNO_3$ in the acid already present increases, the redisintegration of the $HNO_3$ with elimination of water in accordance with Equation 2 reversed and Equation 5 takes place with increasing rapidity.

Accordingly the object of the present invention is to carry out the interaction known per se between water or dilute nitric acid, nitrogen oxides and oxygen in a column or column-type apparatus under such conditions that the formation of fresh $HNO_3$ in accordance with Equation 2 is promoted along the entire passage of the liquid trickling down in the column, and the re-disintegration of the $HNO_3$ formed in accordance with Equation 2 reversed and Equation 5 is as far as possible prevented.

This object is attained in accordance with this invention in contradistinction to the aforesaid known processes, on the one hand by so limiting the heat supplied to the lower part of the column, that at this point the temperature only reaches the boiling point at the prevailing pressure of the nitric acid having the desired maximum content of $HNO_3$ and a content of $N_2O_4$, amounting to about 5 to 20% and that therefore the boiling temperature at the prevailing pressure of nitric acid free from nitrogen oxides and water or even of aqueous nitric acid free from nitrogen oxides is not reached in any part of the column and on the other hand by introducing the oxygen into the lower part of the column.

The result of the last mentioned procedure is that the formation of fresh $N_2O_4$, by the oxidation of the $N_2O_3$ present by the oxygen introduced from below, can take place in the gaseous phase along the entire passage of the liquid trickling down in the column in countercurrent to the ascending gases and vapours. The result of the aforesaid limitation of the heat supply is that the lower oxides of nitrogen, such as $N_2O_3$ and NO or $HNO_2$ formed according to the hereinbefore mentioned Equations 2 and 3, are continuously and extensively removed by the ascending gases and vapours from the downwardly trickling liquid during its passage through the column, with considerable assistance by the oxygen flowing from below upwards, but that by far the greatest part of the nitrogen tetroxide not yet converted into $HNO_3$ according to Equation 2 remains in the liquid.

As a result of this procedure opportunity is afforded along the entire passage of the downwardly trickling liquid for the formation of fresh nitric acid in accordance with the above combined Equation 1, whilst, owing to the continuous removal of the lower nitrogen oxides primarily formed thereby according to Equations 2 and 3, the said lower oxides are to a great extent prevented from exerting a reducing action on the already formed $HNO_3$ in accordance with Equation 2 reversed and Equation 5. By the co-operation of the aforementioned factors and the attendant promotion of the processes favouring the formation of acid and counteracting the suppression of the formation of acid, the present invention enables concentrated acid to be produced in the shortest conceivable time and under the most advantageous economic conditions imaginable.

A further advantage of the process according to this invention is that the material of the apparatus is subjected to uniform pressure and temperature conditions, whereby shearing and blistering of the acid-resisting linings, which are otherwise to be feared, are to a great extent avoided.

The reaction which proceeds exothermically is, as is known, influenced by the temperature and the pressure, in that for the production of highly concentrated acids correspondingly higher temperatures and pressures are necessary. The reaction temperature may also be regulated by heat exchange, for example between the discharging hot acid and the introduced oxygen, in heat exchange devices known per se. For carrying the process into effect a distillation column containing distributing elements, such as perforated plates, Raschig rings or the like, may be employed, which is provided at its lower end with a liquid sump, capable, for example, of being heated with the aid of a steam packet, and at its upper end with a dephlegmator, the water or the dilute nitric acid being introduced into the upper part and the oxygen into the lower part of the column. The nitrogen oxides may be introduced into the upper part or, particularly in the production of very highly concentrated acids, also into the lower part of the column.

The nitrogen oxides are employed in excess in such a way that the finished acid contains about 5 to 20% of $N_2O_4$. The finished acid after removal from the apparatus can then be bleached by the usual methods. It is advisable to effect the bleaching in a separate distillation column directly connected with the reaction column, in which event the distilled off nitrogen oxides can be separately condensed and be then again introduced into the reaction column together with fresh $N_2O_4$.

By suitably proportionating the liquid sump disposed in the lower part of the column, the time that the reaction liquid remains in the pressure apparatus can be regulated in accordance with actual requirements. Such a sump may also be replaced by a sufficient number of suitable column bases or be sub-divided into smaller sumps.

The oxygen necessary for the process is introduced into the lower portion of the column either above the surface of the liquid or, as is particularly advisable, into the liquid itself, or be forced under pressure through the aforementioned liquid sump in a state of fine division, for example by employing finely perforated plates.

The uniform introduction of $N_2O_4$ and water or dilute nitric acid which is necessary in order to maintain a constant proportion of the reaction components, is preferably effected with the aid of cog wheel pumps. It may, however, also be effected by other conveying means, such as plunger pumps or rotating slide valve pumps.

In order to prevent the partial pressure of the oxygen from being too extensively detrimentally influenced by impurities in the oxygen, such as nitrogen, argon, and the like, a little waste gas, for example about 10 to 20% of the compressed gases, is preferably allowed constantly to escape from the upper part of the column.

In order to carry out the process successfully it is important to introduce the reaction components and to remove the finished crude acid as regularly as possible. The continuous discharge of the acid is most suitably ensured with the aid of one or more floating elements of sufficiently large construction. In the event of any disturbance of the float taking place, electric safety devices or contacts are with advantage provided, which operate in such a way that when the level of the liquid rises too high in the reaction apparatus, the gas and liquid inflow are automatically interrupted.

In the case of processes operating at relatively low pressures, such as are employed for less highly concentrated acids, the acid discharge can further also be effected for example through a liquid seal. For the continuous discharge of the waste gases, regulating members such as are usually employed in high pressure plants are, with advantage, provided. The waste gases can likewise be removed through a liquid seal which is advantageous particularly in the case of relatively low pressure processes.

The parts of the apparatus exposed to the action of acid are with advantage constructed, in accordance with the concentration and composition of the acid in question, from ferro-silicon, tantalum, quartz, aluminium or the like corrosion-resisting material, or are lined with such material.

In the accompanying drawings two apparatus suitable for carrying the process into effect are diagrammatically illustrated by way of example. The two apparatus have the following common parts: $a$ is a fractionating column with perforated bottoms $b$; $c$ the dephlegmator with cooling water jacket $d$; $e$ the safety valve; $g$ the inlet for water or dilute nitric acid with the aid of the cog wheel pump $h$ and the throttle valve $i$; $l$ the liquid sump.

The apparatus of Fig. 1 is made for the production of nitric acid under high pressure according to the Example 2. $f$ is the device for blowing off the waste gases on the top of the column; $k$ the inlet for nitrogen oxides; $m$ a steam jacket; $n$ the inlet for oxygen through the perforated plate $o$; $p$ and $p_1$ respectively are the inlet and outlet for steam; $q$ a floating element for the continuous discharge of the nitric acid with the electric safety device $r$; $t$ the control valve for the discharge of the concentrated nitric acid.

Figure 2:
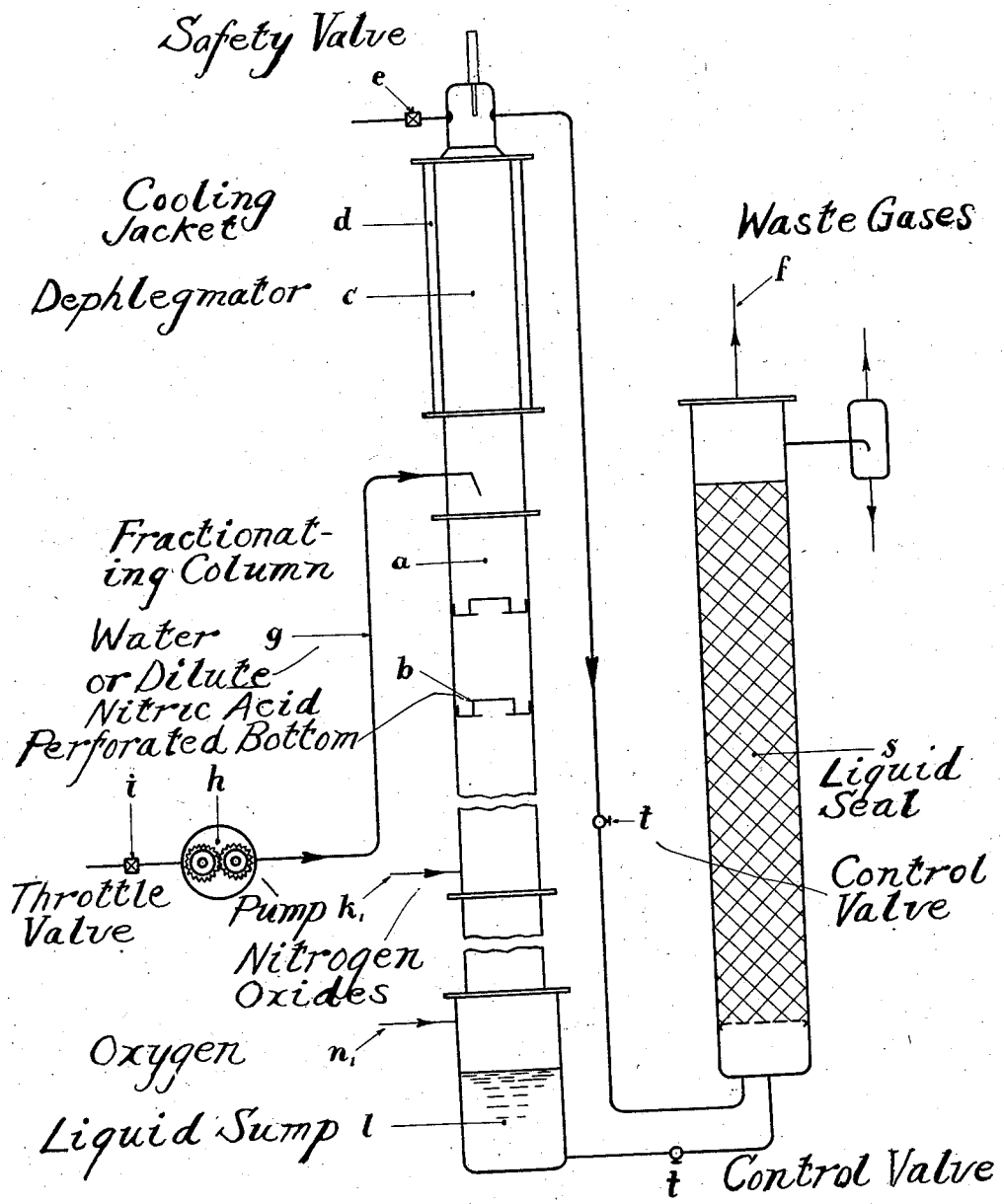

The apparatus of Fig. 2 is made for low pressures and temperatures according to Example 1. $f$ is the device for blowing off waste gases, which comes from the top of the column and pass the liquid seal $s$; $K_1$ the inlet for nitrogen oxides; $l$ the liquid sump; $n$ the inlet for oxygen; $s$ the liquid seal for the continuous discharge of the concentrated nitric acid and waste gases; $t$ are control valves.

The results obtained on carrying out the present process are, for example, as follows:

|  | I | II | III |
|---|---|---|---|
| Total pressure in atmospheres | 0.8–1.2 | 3.2 | 50 |
| Average temperature in degrees centigrade | 25–35 | 30–40 | Approx. 100 |
| Time of flow through the column in seconds (approximately) | 60 | 40–50 | 60 |
| Concentration of the finished acid, percent | 70–80 | 84–85 | 97 |
| Waste gas, percent | 10–20 | 10–20 | 10–20 |
| Height of column in metres | 5 | 5 | 6 |
| Diameter of column in mms. (approximately) | 250 | 250 | 300 |
| Output—metric tons/day (approximately) | 15 | 15 | 15 |

*Examples*

1. (See Fig. 2.) A 5 metre high column having an average diameter of about 250 mms. and filled with Raschig rings of white ware was employed for the continuous production of a 70–80% nitric acid. At its lower end a liquid sump was situated, having a capacity of about 20 litres and connected with a liquid seal for the continuous blowing off of the acid. A perforated plate was further disposed in the liquid sump, through which the oxygen was forced under pressure in a state of fine division into the liquid. At the upper end of the column a dephlegmator cooled with water was disposed. The waste gas was continuously drawn off through a liquid seal. By regulating the quantities of steam and of the cooling water in the dephlegmator, the temperature conditions in the column could be so adjusted that the reinforced distilling and rectifying effects, necessary for attaining the maximum output, took place therein. The temperature in the sump was maintained by heating at 30–35° C. The dilute nitric acid is introduced at a point two-thirds up the height of the column and the nitrogen oxides were introduced at a point ⅓ up the height of the column. The working pressure prevailing in the column was approximately 0.8 to 1.2 atmospheres and the average temperature about 25–35° C. The nitric acid and the $N_2O_4$ flowed under their own hydrostatic pressure into the reaction column. The quantity of nitric acid introduced per day amounted to approximately 8.3 metric tons of 50% nitric acid and the quantity of the nitrogen oxides to approximately 9.5 metric tons. The nitric acid produced per day amounted to about 15 metric tons calculated on the already bleached 78–80% acid. The crude acid containing 15–20% of tetroxide was bleached immediately after the process, the nitrogen oxides distilled over being again employed. The quantity of oxygen forced in amounted to approximately 1,000 cubic metres of 96% $O_2$ per day. The nitrogen oxides present in the waste gases were recovered.

2. For the production of an approximately 97% nitric acid an apparatus constructed for a working pressure of 50 atmospheres was employed (see Fig. 1).

The reaction column had a diameter of 300 mms. and a height of 6 metres and was provided with dephlegmator and liquid sump. It contained 20 perforated plates, over which the reaction liquid trickled downwards, whilst oxygen flowed through from below upwards. The dilute nitric acid and the nitrogen oxides are introduced at a point about two-thirds up the height of the column.

The inflow of $N_2O_4$ amounted to approximately 12 metric tons and that of the dilute, i. e. 50% $HNO_3$, to approximately 5.6 metric tons per day. Both liquids were continuously forced in a uniform stream into the reaction apparatus by means of cog wheel pumps. The oxygen required for the oxidation amounted to 60 cubic metres per hour.

The heating conditions were so regulated that an increased partial fractional distillation took place in the column. For this purpose the lower part of the column was slightly heated with steam, whilst the resulting vapours were again condensed by the dephlegmator disposed higher up.

The acid obtained in the continuous operation and thereafter immediately bleached possessed a final concentration of about 97% $HNO_3$. The output amounted to 14–16 metric tons per day.

What I claim is:

1. Method of continuously producing concentrated nitric acid from water or dilute nitric acid, nitrogen oxides and oxygen at superatmospheric pressure which comprises bringing downwardly flowing liquid reaction components and reaction products in intimate contact with upwardly rising oxygen and with upwardly rising reaction products in the form of gases or vapors through a tempreature gradient, said tempreature gradient being obtained by heating the acid accumulating at the lowest point of the path of the liquid enriched by the $HNO_3$ formed during its downward flow and containing an excess $N_2O_4$ to a temperature corresponding at the pressure used to the boiling temperature of an acid having the highest desired $HNO_3$ concentration and having a content of about 5 to 20% $N_2O_4$, and condensing by cooling at the highest point of the gas path the rising hydrous vapors, whereby the reaction process is carried out in the form of a fractional distillation, the lower nitrogen oxides are continuously carried upwards and nitrogen tetroxide remains in such quantity in the liquid trickling downwards that fresh $HNO_3$ is constantly formed in said downwardly trickling liquid and the liquid nitric acid having the desired highest content of $HNO_3$ and a content of about 5 to 20% $N_2O_4$ is obtained at the lower end of its path and may be collected therefrom.

2. Method of continuously producing concentrated nitric acid from water or dilute nitric acid, nitrogen oxides and oxygen at superatmospheric pressure which comprises bringing downwardly flowing liquid reaction components and reaction products in intimate contact with upwardly rising oxygen and with upwardly rising reaction products in the form of gases or vapors through a temperature gradient, said temperature gradient being obtained by heating the acid accumulating at the lowest point of the path of the liquid enriched by the $HNO_3$ formed during its downward flow and containing excess $N_2O_4$ to a temperature corresponding at the pressure used to the boiling temperature of an acid having the highest desired $HNO_3$ concentration and having a content of about 5 to 20% $N_2O_4$, and condensing by cooling at the highest point of the gas path the rising hydrous vapors whereby the reaction process is carried out in the form of a fractional distillation, the lower nitrogen oxides are continuously carried upwards, and nitrogen tetroxide remains in such quantity in the liquid trickling downwards that fresh $HNO_3$ is constantly formed in said downwardly trickling liquid, and liquid nitric acid having the desired highest content of $HNO_3$ and a content of about 5 to 20% $N_2O_4$ is obtained at the lower end of its path and may be continuously removed, and in which process the inert gases accumulating at the highest point of the path of the liquid are removed at least from time to time.

3. A process for the production of concentrated nitric acid which comprises mixing at a pressure higher than atmospheric a downwardly flowing stream of water and nitrogen oxides with a stream of oxygen flowing counter-current thereto, and establishing in said mixed counterflowing streams a thermal gradient corresponding at the upper region thereof to the condensation point of hydrous vapors and at the lower region thereof to the temperature corresponding at the prevailing pressure to the boiling point of concentrated nitric acid containing about 5% to about 20% $N_2O_4$, whereby liquid concentrated nitric acid containing about 5% to about 20% $N_2O_4$ is collected at said lower region of the mixture and excess nitrogen oxides and vapors are swept into the upper cooler regions thereof by said upward stream of oxygen.

4. The process set forth in claim 3 in which the ascending oxygen is mixed under pressure and in a state of fine division with said downward stream.

5. The process set forth in claim 3 in which the upward stream of oxygen is mixed with said downward stream at a point above the surface of the liquid nitric acid collected.

6. The process set forth in claim 3 in which the upward stream of oxygen is introduced in the liquid nitric acid collected.

7. The process set forth in claim 3 in which the liquid nitric acid formed is allowed to collect and is withdrawn in a substantially continuous manner.

EMIL LÜSCHER.